(12) United States Patent
Lin et al.

(10) Patent No.: US 7,293,660 B2
(45) Date of Patent: Nov. 13, 2007

(54) FILTER ASSEMBLY HAVING A FIVE-WAY VALVE

(76) Inventors: Koo Chang Lin, No. 119-27, Sec. 3, Yuanlu Road, Dayou Tsuen, Puyen Hsiang, Changhua Hsien 516 (TW); Chin Kao Lin, No. 15, Lane 10, Chonmin 13th Street, Tainan 701 (TW)

( * ) Notice: Subject to any disclaimer, the term of this patent is extended or adjusted under 35 U.S.C. 154(b) by 527 days.

(21) Appl. No.: 11/022,356

(22) Filed: Dec. 22, 2004

(65) Prior Publication Data

US 2006/0237359 A1   Oct. 26, 2006

(51) Int. Cl.
*B01D 35/30* (2006.01)
*B01D 35/16* (2006.01)

(52) U.S. Cl. .................. 210/425; 210/429
(58) Field of Classification Search ........ 210/424, 210/425, 429; 137/625.21, 625.19, 625.18
See application file for complete search history.

(56) References Cited

U.S. PATENT DOCUMENTS

| | | | |
|---|---|---|---|
| 3,262,570 A | 7/1966 | Gailitis et al. | |
| 3,289,847 A | 12/1966 | Rothemund | |
| 3,513,981 A * | 5/1970 | Mendelow | 210/411 |
| 3,896,029 A * | 7/1975 | Beuselinck | 210/341 |
| 4,629,568 A | 12/1986 | Ellis, III | 210/636 |
| 6,245,233 B1 * | 6/2001 | Lu | 210/278 |

\* cited by examiner

*Primary Examiner*—Terry K Cecil
(74) *Attorney, Agent, or Firm*—Charles E. Baxley (57) ABSTRACT

A filter device includes four couplers attached to four sides, and a casing attached to bottom. A filtering material receptacle may be attached to the casing for filtering the water. A valve member is rotatably received in the housing, and includes six openings and four spaces and to communicate the openings of the valve member with each other, and includes two passageways for communicating with two openings of the valve member. The filtering material may be flushed with the water, and may be forced to change ion or to be cleaned with cleansing agent simply by rotating the valve member relative to the housing.

5 Claims, 6 Drawing Sheets

FILTER ASSEMBLY HAVING A FIVE-WAY VALVE

BACKGROUND OF THE INVENTION

1. Field of the Invention

The present invention relates to a filter assembly, and more particularly to a filter assembly having a five-way valve device disposed therein for allowing the filter assembly to easily operate various kinds of operations by simply rotating the five-way valve device.

2. Description of the Prior Art

Various kinds of typical filter devices have been developed and comprise one or more filter members or fluid conditioning medium disposed in an outer housing, and the outer housing includes an inlet for receiving water and for allowing the water to be filtered by the filter members or fluid conditioning medium, and an outlet for allowing the filtered water to flow out of the outer housing.

For example, U.S. Pat. No. 3,262,570 to Gailitis et al., and U.S. Pat. No. 3,289,847 to Rothemund disclose two of the typical filter devices each also comprising one or more filter members or fluid conditioning medium disposed in an outer housing, for filtering the water flowing into the outer housing and flowing through the filter members or fluid conditioning medium.

However, while the water flowing through the filter members or fluid conditioning medium, dirt or particles or contaminants may be filtered and attached onto the filter members or fluid conditioning medium, and may quickly block the filter members or fluid conditioning medium, such that the filter members or fluid conditioning medium may have to be changed with new ones from time to time.

U.S. Pat. No. 4,629,568 to Ellis, III discloses another typical filter device also comprising one or more filter members or fluid conditioning medium for filtering the water flowing into the outer housing, and further comprising a flushing arrangement for cleansing the concentrate side of a reverse osmosis membrane at the conclusion of a purifying cycle.

However, the flushing arrangement may be arranged or used for cleansing the concentrate side of the reverse osmosis membrane only, and may not be used or arranged to change ion with the filter members or fluid conditioning medium.

The present invention has arisen to mitigate and/or obviate the afore-described disadvantages of the conventional filter devices.

SUMMARY OF THE INVENTION

The primary objective of the present invention is to provide a filter assembly including a five-way valve device disposed therein for allowing the filter assembly to easily operate various kinds of operations by simply rotating the five-way valve device.

In accordance with one aspect of the invention, there is provided a filter assembly comprising a housing including four sides having a first coupler, a second coupler, a third coupler, a fourth coupler attached thereto, and including a bottom portion having a casing attached thereto, the first coupler being provided for coupling to a water reservoir to receive water therefrom, the fourth coupler including a passage formed therein, for coupling to the casing, the casing including a center bore and a first orifice and a second orifice formed therein, a receptacle for receiving filtering material therein, and attached to the casing, and communicating with the center bore and the first and the second orifices of the casing, for allowing water to flow into and out of the casing, and to be filtered by the filtering material of the receptacle, and a valve member rotatably received in the housing, and including a first opening, a second opening, a third opening, a fourth opening, a fifth opening, and a sixth opening formed in an outer peripheral portion thereof, and spaced away from each other. The first and the third openings are arranged 90 degrees apart from each other, the second opening being located between the first and the third openings, the first and the sixth openings are arranged 90 degrees apart from each other, the six opening being located opposite to the third opening, the fourth and the fifth openings being arranged 90 degrees apart from each other, and located between the sixth and the third openings of the valve member, the valve member includes at least one partition provided therein, to form a first space therein and communicating with the first opening of the valve member, and to form a second space therein and communicating with the second and the third openings of the valve member, and to form a center pathway therein and communicating with the second and the third openings and the second space of the valve member, and to form a third space therein and communicating with the fourth and the fifth openings of the valve member, and a fourth space formed therein and communicating with the sixth opening of the valve member. The valve member includes a first passageway and a second passageway formed therein, and communicating with the first and the sixth openings of the valve member respectively, and for selectively communicating the first and the sixth openings of the valve member with the first and the second orifices of the casing respectively, the water may flow into the first space and the first opening of the valve member when the first opening of the valve member is aligned with the first coupler of the housing, and may then flow into the receptacle via the first passageway the valve member and the first orifice of the casing, to allow the water to be filtered by the filtering material of the receptacle, and the filtered water may then flow through the center bore of the casing and into the center pathway of the valve member, and may then flow out through the second space and the third opening of the valve member. The water may be arranged to flow into the third opening of the valve member then flow into the second space and the center pathway of the valve member when the third opening of the valve member is aligned with the first coupler of the housing, and may then flow into the center bore of the casing to flush the filter material, the water may then flow out through the second orifice of the casing and through the second passageway the valve member and then to flow out through the fourth space and the sixth opening of the valve member and then to flow out through the third coupler of the housing. The water may flow into the fifth opening of the valve member and may flow through the third space of the valve member, and may then flow into the passage of the coupler when the fifth opening of the valve member is aligned with the first coupler of the housing, and the water may flow into the sixth opening and the fourth space of the valve member when the sixth opening of the valve member is aligned with the first coupler of the housing, and may then flow into the receptacle via the second passageway of the valve member and the first orifice of the casing.

The fourth coupler includes a Venturi tube engaged into the passage thereof, the coupler includes a mouth communicating with the passage thereof, and a canister coupled to the mouth of the coupler for receiving a medium, such as salt, therein, and arranged to have the medium drawn into the passage of the coupler by the Venturi tube when the water flow through the Venturi tube, to allow the salt to be drawn into the coupler and to change ion with the filter material.

The fourth coupler includes a spring disposed therein and engaged with the Venturi tube, for biasing and positioning the Venturi tube in the passage of the coupler, and for preventing the Venturi tube from being moved relative to the coupler.

The valve member includes a tubular member extended downwardly therefrom and rotatably engaged with the casing, and thus to stably attach and secure and retain the valve member to the housing.

The housing includes a driving stem rotatably attached thereto and having a stud engaged with the valve member, for rotating the first and the second and the third and the fourth and the fifth and the sixth openings of the valve member to be selectively aligned with the couplers of the housing respectively.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
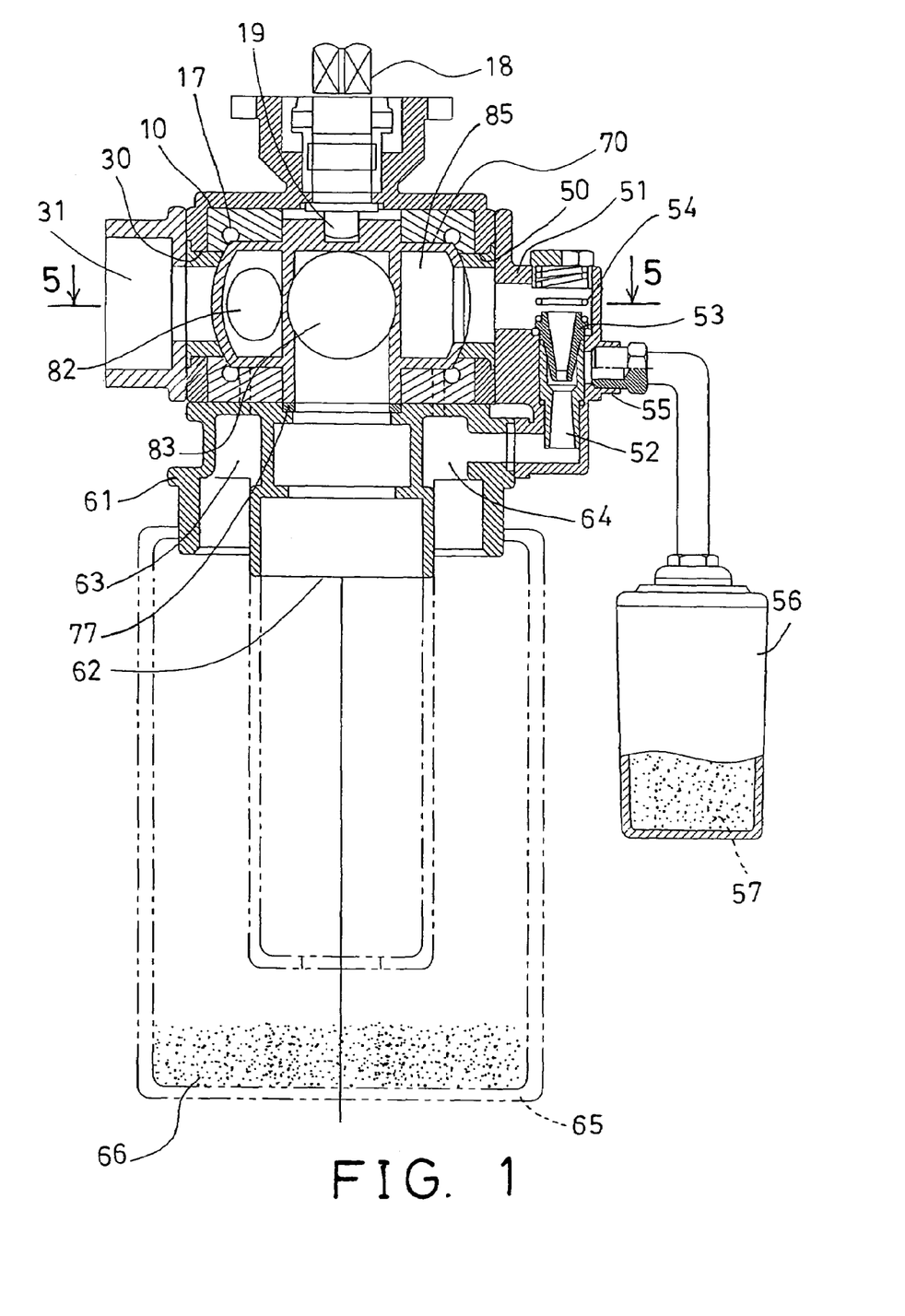
FIG. 1 is a cross sectional view of a filter assembly in accordance with the present invention.
Figure 2:
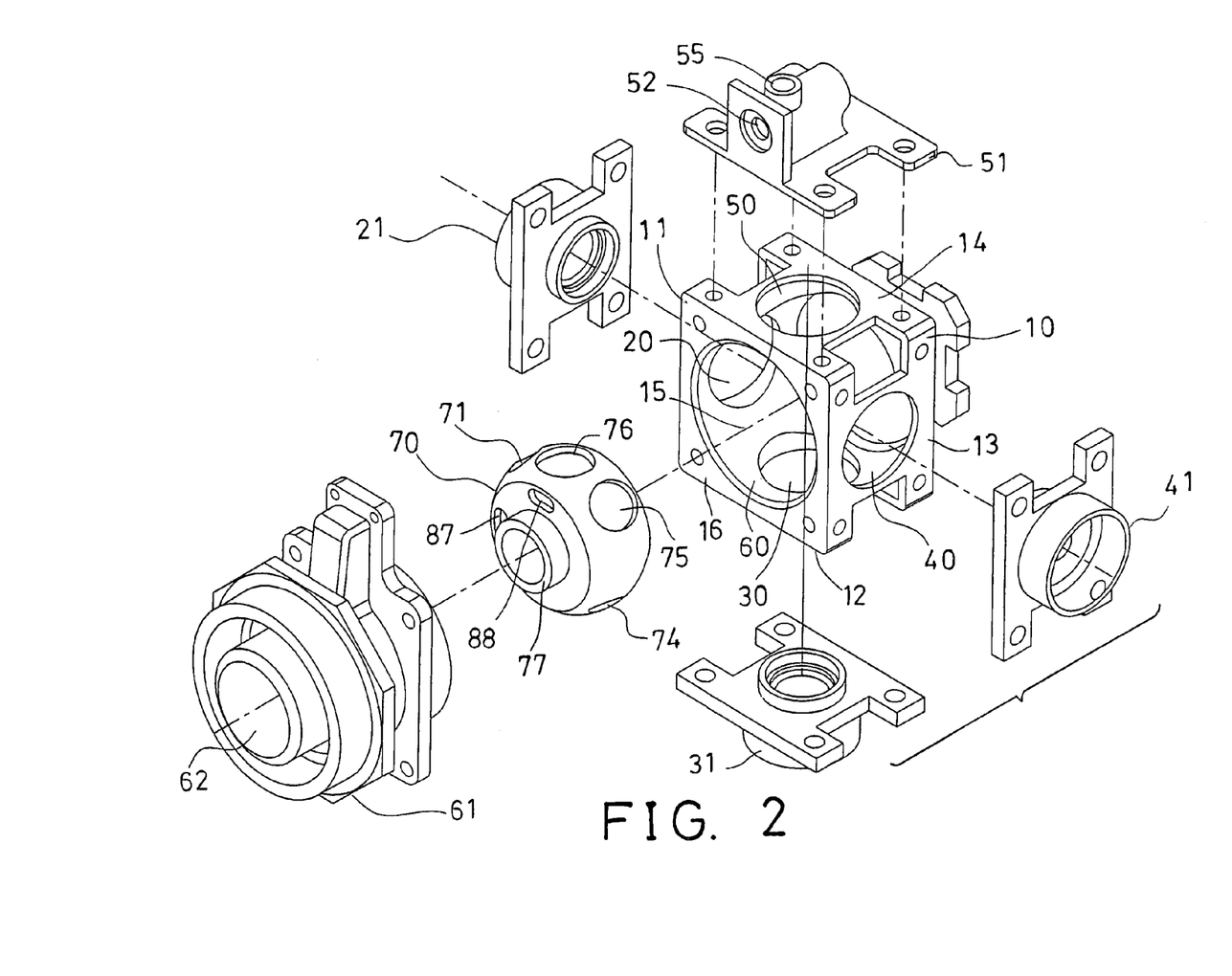
FIG. 2 is a partial exploded view of the filter assembly.
Figure 3:
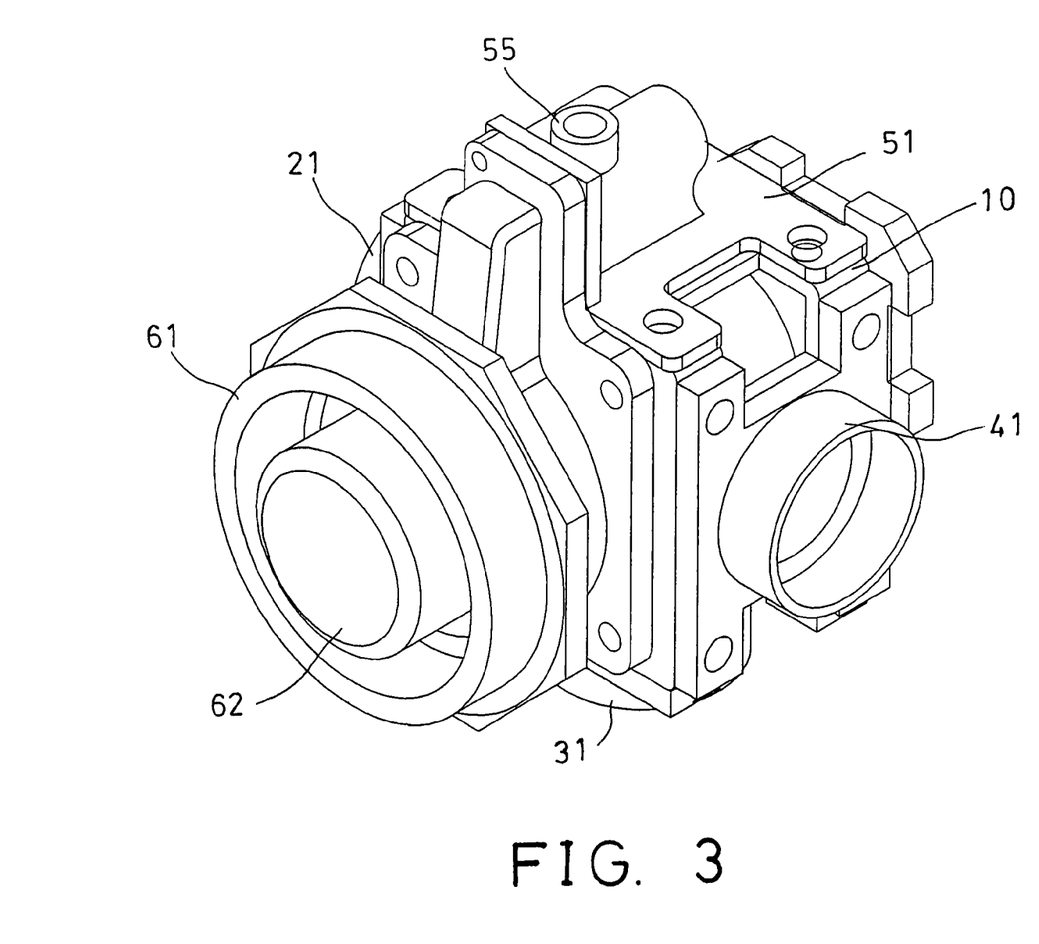
FIG. 3 is a perspective view illustrating a portion of the filter assembly.
Figure 4:
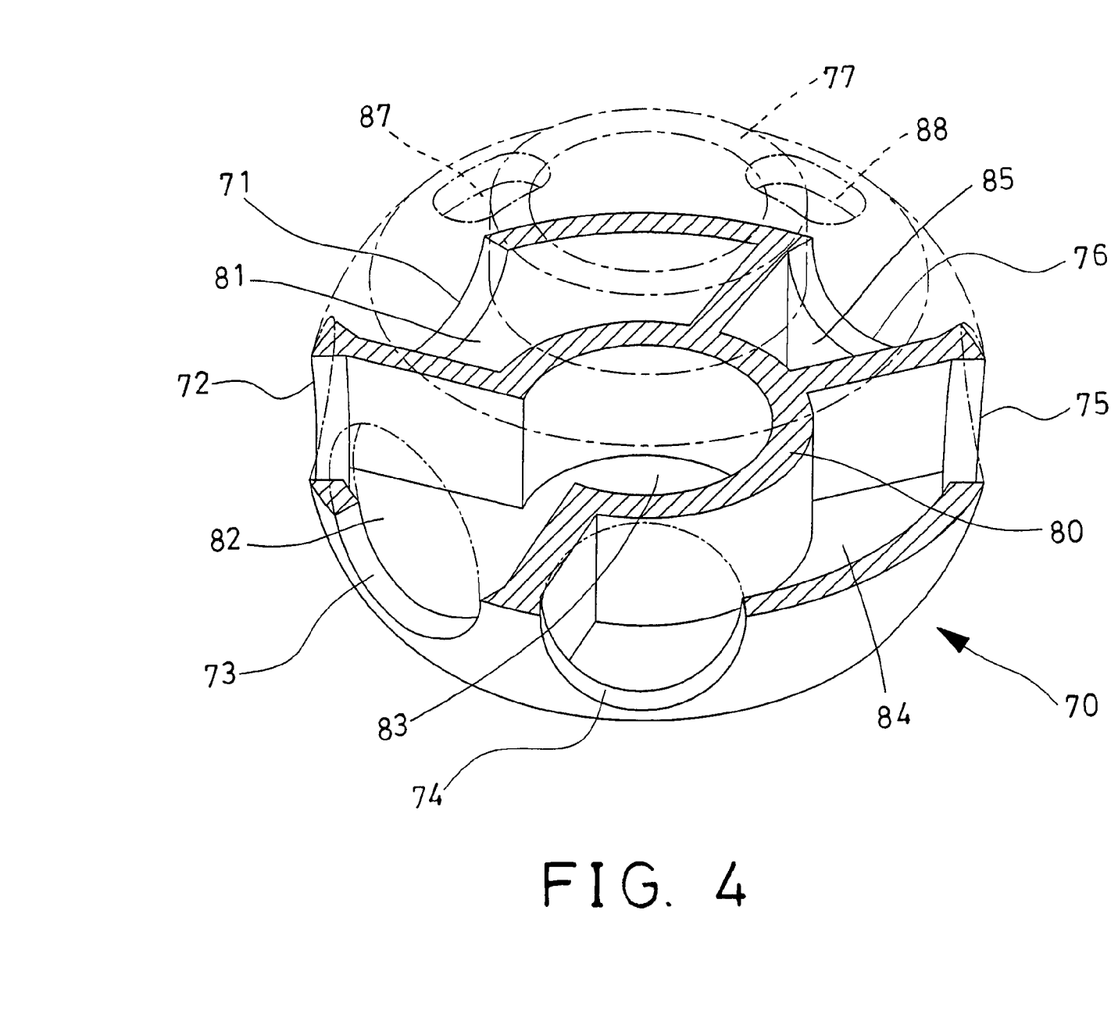
FIG. 4 is a bottom perspective view of a five-way valve device for the filter assembly.

Referring to the drawings, and initially to FIGS. 1-3, a filter assembly 1 in accordance with the present invention comprises a housing 10 including four sides 11, 12, 13, 14 each having a hole 20, 30, 40, 50 formed therein, and each having a coupler 21, 31, 41, 51 attached thereto, in which the coupler 21 is provided for coupling to a water reservoir, for receiving water from the water reservoir, and for allowing the water to flow into an inner chamber 15 of the housing 10.

The housing 10 further includes a bottom side 16 having another hole 60 formed therein, and having a coupler or a port or a casing 61 attached thereto, in which the casing 61 includes a center bore 62 and two orifices 63, 64 formed therein (FIG. 1). A receptacle 65 is provided for receiving filtering materials 66 therein, such as mineral particles 66, and may be attached to the casing 61, and may be communicated with the center bore 62 and the orifices 63, 64 of the casing 61, for allowing water or fluid to flow into and out of the casing 61, and to be filtered by the filtering materials 66 of the receptacle 65.

As shown in FIGS. 1 and 2, the coupler 51 includes a passage 52 formed therein, for coupling to the one of the orifices 64 of the casing 61, and includes a Venturi tube 53 engaged into the passage 52 thereof, a spring 54 engaged with the Venturi tube 53, for biasing and positioning the Venturi tube 53 in the passage 52 of the coupler 51. The coupler 51 further includes a mouth 55 formed or provided therein, and communicating with the passage 52 thereof, for coupling to a canister 56 which may be provided for receiving cleansing medium or ion medium or other fluid medium 57 therein, such as cleaning agents, salts, or the like.

As shown in FIGS. 1-2 and 4-8, a valve member 70 is rotatably received and secured in the housing 10 with one or more bearings 17 (FIG. 1), and includes six openings 71, 72, 73, 74, 75, 76 formed in series in the outer peripheral portion thereof, and spaced away from each other. It is preferable that the valve member 70 includes a tubular member 77 extended downwardly therefrom (FIGS. 1, 2), for rotatably engaging with the casing 61, and thus for further stably attaching the valve member 70 to the housing 10.

For example, as shown in FIGS. 5-8, the first and the third openings 71, 73 are 90 degrees apart from each other, and the second opening 72 is provided or located between the first and the third openings 71, 73. The first and the sixth openings 71, 76 are also 90 degrees apart from each other, and the six opening 76 is provided or located opposite to the third opening 73, or is 180 degrees apart from the third opening 73. The fourth and the fifth openings 74, 75 are also 90 degrees apart from each other, and provided or located between the sixth and the third openings 76, 73 of the valve member 70.

The valve member 70 further includes one or more partitions 80 formed or provided therein, to form a first space 81 therein and communicating with the first opening 71 of the valve member 70, and to form a second space 82 which is communicated with the second and the third openings 72, 73 of the valve member 70, and further to form a center pathway 83 therein and communicating with the second and the third openings 72, 73 and the second space 82 of the valve member 70.

The valve member 70 further includes a third space 84 formed or provided therein and defined by the partitions 80, and communicating with the fourth and the fifth openings 74, 75 of the valve member 70, and further includes a fourth space 85 formed or provided therein and communicating with the sixth opening 76 of the valve member 70. The valve member 70 further includes two passageways 87, 88 formed or provided therein, and communicating with the first and the sixth openings 71, 76 of the valve member 70 respectively, and for selectively communicating the first and the sixth openings 71, 76 of the valve member 70 with the orifices 63, 64 of the casing 61 respectively.

The housing 10 includes a driving stem 18 (FIG. 1) rotatably attached thereto and having a stud 19 engaged with the valve member 70, for operating or rotating the openings 71-76 of the valve member 70 to align with and to communicate with the holes 20, 30, 40, 50 and/or the couplers 21, 31, 41, 51 of the housing 10 respectively.

Figure 5:
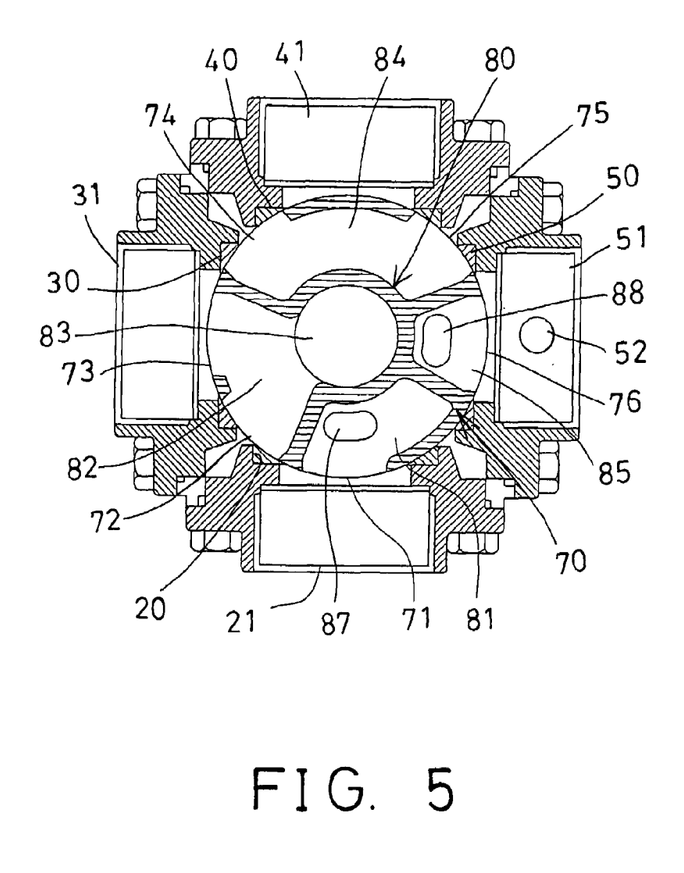
FIG. 5 is a partial cross sectional view of the filter assembly, taken along lines 5-5 of FIG. 1.

In operation, as shown in FIG. 5, when the valve member 70 is rotated relative to the housing 10 to align the first opening 71 of the valve member 70 with the coupler 21 of the housing 10, the water from the water reservoir may flow into the first space 81 via the first opening 71 of the valve member 70, and may then flow into the receptacle 65 via the passageway 87 the valve member 70 and the orifice 63 of the casing 61.

The water may thus be filtered by the filtering materials 66 of the receptacle 65, and the filtered water may then flow through the center bore 62 of the casing 61 (FIG. 1), and then flow into the center pathway 83 of the valve member 70, and then flow out through the second space 82 and the third opening 73 of the valve member 70 (FIG. 5), for allowing the filtered water to be supplied and used by users. After operating the filtering process for a predetermined time interval, dirt or particles or contaminants may be filtered and attached onto the filter materials 66.

Figure 6:
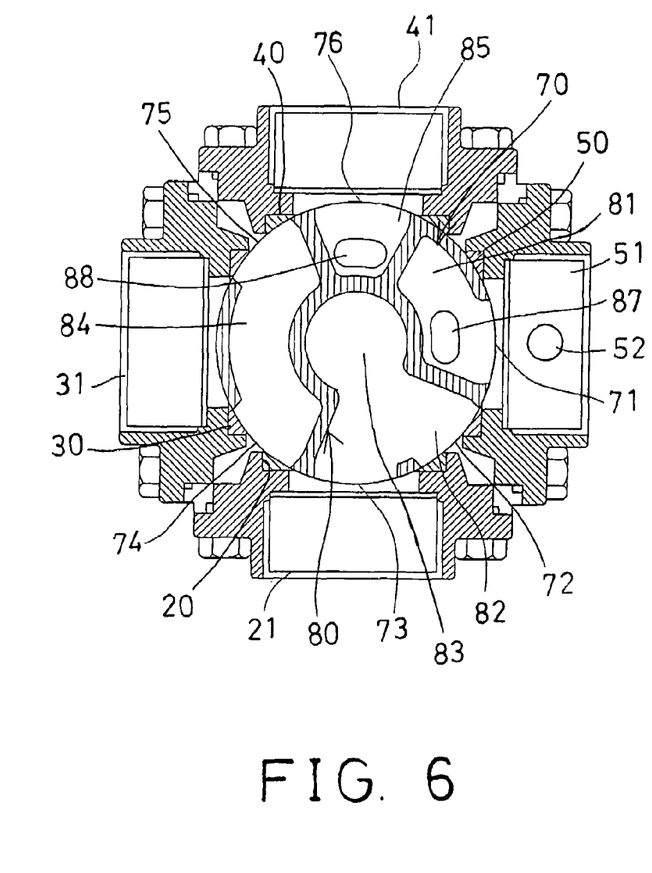
FIGS. 6, 7, 8 are partial cross sectional views similar to FIG. 5, illustrating the operation of the filter assembly.

As shown in FIG. 6, the valve member 70 may then be rotated counterclockwise relative to the housing 10 for 90 degrees, to align the third opening 73 of the valve member 70 with the coupler 21 of the housing 10, the water from the water reservoir may thus flow into the third opening 73 of the valve member 70 via the coupler 21 of the housing 10, and then flow into the second space 82 and the center pathway 83 of the valve member 70, and then flow into center bore 62 of the casing 61 (FIG. 1) to flush or to clean the filter materials 66, and to remove dirt or particles from the filter materials 66. The cleaned water may then flow out through the other orifice 64 of the casing 61 and through the other passageway 88 the valve member 70 (FIG. 6), and then to flow out through the fourth space 85 and the sixth opening 76 of the valve member 70 and then to flow out through the coupler 41 of the housing 10.

Figure 7:
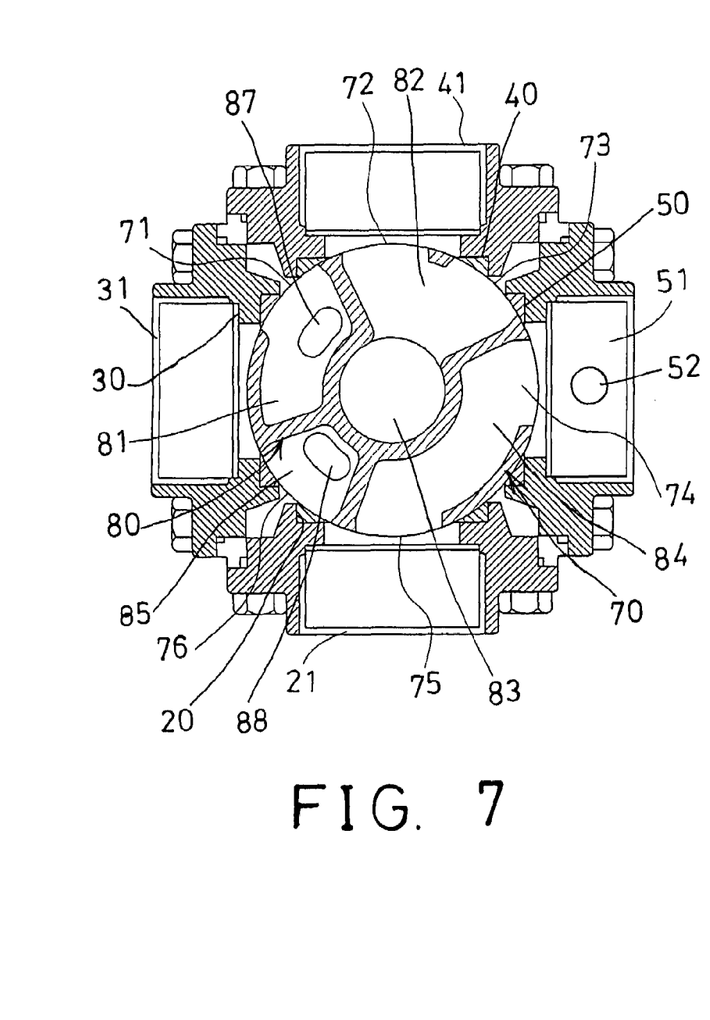

As shown in FIG. 7, after the filter materials 66 has been subjected with the flushing or cleaning process, the valve member 70 may then further be rotated counterclockwise relative to the housing 10 for 135 degrees, to align the fifth opening 75 of the valve member 70 with the coupler 21 of the housing 10, the water from the water reservoir may thus flow into the fifth opening 75 of the valve member 70, and then flow through the third space 84 of the valve member 70, and then flow into the passage 52 of the coupler 51 (FIG. 1), and then flow through the Venturi tube 53, and then flow into the receptacle 65 via the other orifice 64 of the casing 61.

At this moment, or when the water flow through the Venturi tube 53, the medium 57, such as the salt 57 of the canister 56 may be drawn into the passage 52 of the coupler 51 (FIG. 1) by or due to the Venturi tube 53, and may then be drawn into the receptacle 65, to allow the filter materials 66 further to be cleaned or to be changed with ions with the medium 57, for such as reviving or refreshing the function of the filter materials 66. The refreshing water may then flow through the center bore 62 of the casing 61 (FIG. 1), and then flow into the center pathway 83 of the valve member 70 (FIG. 7), and then flow out through the second space 82 and the second opening 72 of the valve member 70, and then to flow out through the coupler 41 of the housing 10.

Figure 8:
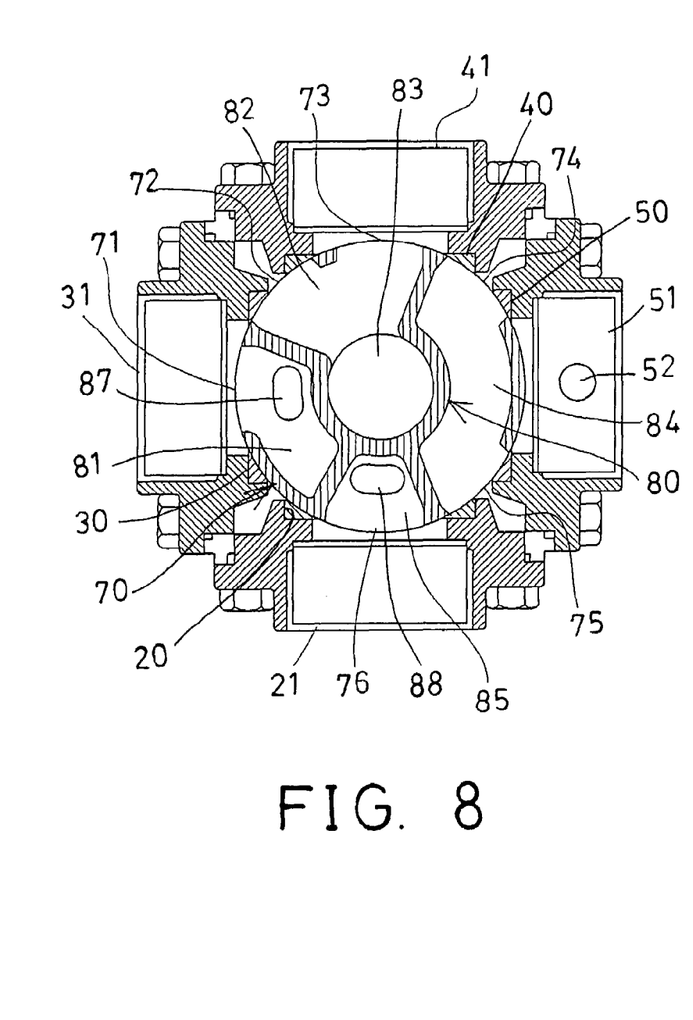

After cleaning or after changing ion with the salt medium 75, as shown in FIG. 8, the valve member 70 may then further be rotated counterclockwise relative to the housing 10 for 45 degrees, to align the sixth opening 76 of the valve member 70 with the coupler 21 of the housing 10, the water from the water reservoir may thus flow into the sixth opening 76 and the fourth space 85 of the valve member 70, and then may flow into the receptacle 65 via the other passageway 88 of the valve member 70 and the orifice 63 of the casing 61.

The water flowing into the receptacle 65 may thus be used to flush or to clean the filter materials 66, or to flush or to remove the salt medium 57 from the filter materials 66. The water may then flow through the center bore 62 of the casing 61 (FIG. 1), and then flow into the center pathway 83 of the valve member 70, and then flow out through the second space 82 and the second opening 72 of the valve member 70 (FIG. 8), for allowing the water to flow out through the coupler 41 of the housing 10. The filter materials 66 may thus be readily used for filtering the water again.

It is to be noted that, after operating the filtering process and after dirt or particles or contaminants have been filtered and attached onto the filter materials 66, the filter materials 66 may be easily flushed or cleaned with water, and then cleaned or changed with ions with the medium 57, and then to have the salt medium 57 removed from the filter materials 66 again, by simply rotating the valve member 70 relative to the housing 10.

Accordingly, the filter assembly in accordance with the present invention includes a five-way valve device disposed therein for allowing the filter assembly to easily operate various kinds of operations by simply rotating the five-way valve device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A filter assembly comprising:

a housing including four sides having a first coupler, a second coupler, a third coupler, a fourth coupler attached thereto, and including a bottom portion having a casing attached thereto, said first coupler being provided for coupling to a water reservoir to receive water therefrom, said fourth coupler including a passage formed therein, for coupling to said casing, said casing including a center bore and a first orifice and a second orifice formed therein, a receptacle for receiving filtering material therein, and attached to said casing, and communicating with said center bore and said first and said second orifices of said casing, for allowing water to flow into and out of said casing, and to be filtered by the filtering material of said receptacle, and a valve member rotatably received in said housing, and including a first opening, a second opening, a third opening, a fourth opening, a fifth opening, and a sixth opening formed in an outer peripheral portion thereof, and spaced away from each other, said first and said third openings being arranged 90 degrees apart from each other, said second opening being located between said first and said third openings, said first and said sixth openings being arranged 90 degrees apart from each other, said six opening being located opposite to said third opening, said fourth and said fifth openings being arranged 90 degrees apart from each other, and located between said sixth and said third openings of said valve member, said valve member including at least one partition provided therein, to form a first space therein and communicating with said first opening of said valve member, and to form a second space therein and communicating with said second and said third openings of said valve member, and to form a center pathway therein and communicating with said second and said third openings and said second space of said valve member, and to form a third space therein and communicating with said fourth and said fifth openings of said valve member, and a fourth space formed therein and communicating with said sixth opening of said valve member, said valve member including a first passageway and a second passageway formed therein, and communicating with said first and said sixth openings of said valve member respectively, and for selectively communicating said first and said sixth openings of said valve member with said first and said second orifices of said casing respectively, the water flowing into said first space and said first opening of said valve member when said first opening of said valve member is aligned with said first coupler of said housing, and then flowing into said receptacle via said first passageway said valve member and said first orifice of said casing, to allow the water to be filtered by said filtering material of said receptacle, and the filtered water then flowing through said center bore of said casing and into said center pathway of said valve member, and then flowing out through said second space and said third opening of said valve member, the water flowing into said third opening of said valve member then flow into said second space and said center pathway of said valve member when said third opening of said valve member is aligned with said first coupler of said housing, and then flowing into said center bore of said casing to flush said filter material, the water then flowing out through said second orifice of said casing and through said second passageway said valve member and then to flow out through said fourth space and said sixth opening of said valve member and then to flow out through said third coupler of said housing, the water flowing into said fifth opening of said valve member and flowing through said third space of said valve member, and then flowing into said passage of said fourth coupler when said fifth opening of said valve member is aligned with said first coupler of said housing, and the water flowing into said sixth opening and said fourth space of said valve member when said sixth opening of said valve member is aligned with said first coupler of said housing, and then flowing into said receptacle via said second passageway of said valve member and said first orifice of said casing.

2. The filter assembly as claimed in claim 1, wherein said fourth coupler includes a Venturi tube engaged into said passage thereof, said fourth coupler includes a mouth communicating with said passage thereof, and a canister coupled to said mouth of said fourth coupler for receiving a medium therein, and arranged to have said medium drawn into said passage of said fourth coupler by said Venturi tube when the water flow through said Venturi tube.

3. The filter assembly as claimed in claim 2, wherein said fourth coupler includes a spring disposed therein and engaged with said Venturi tube, for biasing and positioning said Venturi tube in said passage of said fourth coupler.

4. The filter assembly as claimed in claim 1, wherein said valve member includes a tubular member extended downwardly therefrom and rotatably engaged with said casing, to stably attach said valve member to said housing.

5. The filter assembly as claimed in claim 1, wherein said housing includes a driving stem rotatably attached thereto and having a stud engaged with said valve member, for rotating said first and said second and said third and said fourth and said fifth and said sixth openings of said valve member to be selectively aligned with said couplers of said housing respectively.

* * * * *